US010194203B2

United States Patent
Avila et al.

(10) Patent No.: US 10,194,203 B2
(45) Date of Patent: Jan. 29, 2019

(54) MULTIMODAL AND REAL-TIME METHOD FOR FILTERING SENSITIVE MEDIA

(71) Applicants: SAMSUNG ELECTRÔNICA DA AMAZÔNIA LTDA., Campinas (BR); UNIVERSIDADE ESTADUAL DE CAMPINAS, Campinas (BR)

(72) Inventors: Sandra Avila, Campinas (BR); Daniel Moreira, Campinas (BR); Mauricio Perez, Campinas (BR); Daniel Moraes, Campinas (BR); Vanessa Testoni, Campinas (BR); Siome Goldenstein, Campinas (BR); Eduardo Valle, Campinas (BR); Anderson Rocha, Campinas (BR)

(73) Assignees: SAMSUNG ELETRÔNICA DA AMACÔNIA LTDA., Campinas, São Paulo (BR); UNIVERSIDADE ESTADUAL DE CAMPINAS, Campinas, São Paulo (BR)

( * ) Notice: Subject to any disclaimer, the term of this patent is extended or adjusted under 35 U.S.C. 154(b) by 192 days.

(21) Appl. No.: 15/198,626

(22) Filed: Jun. 30, 2016

(65) Prior Publication Data
US 2017/0289624 A1    Oct. 5, 2017

(30) Foreign Application Priority Data

Apr. 1, 2016   (BR) .............................. 102016007265

(51) Int. Cl.
G06K 9/62       (2006.01)
H04N 21/454     (2011.01)
(Continued)

(52) U.S. Cl.
CPC ... *H04N 21/4542* (2013.01); *G06F 17/30817* (2013.01); *G06K 9/00718* (2013.01);
(Continued)

(58) Field of Classification Search
None
See application file for complete search history.

(56) References Cited

U.S. PATENT DOCUMENTS

| 8,285,118 B2 | 10/2012 | Bronstein et al. |
| 2003/0126267 A1 | 7/2003 | Gutta et al. |

(Continued)

OTHER PUBLICATIONS

Caetano, Carlos, et al. "Pornography detection using bossanova video descriptor." Signal Processing Conference (EUSIPCO), 2014 Proceedings of the 22nd European. IEEE, 2014.*

*Primary Examiner* — Sean M Conner

(57) ABSTRACT

A multimodal and real-time method for filtering sensitive content, receiving as input a digital video stream, the method including segmenting digital video into video fragments along the video timeline; extracting features containing significant information from the digital video input on sensitive media; reducing the semantic difference between each of the low-level video features, and the high-level sensitive concept; classifying the video fragments, generating a high-level label (positive or negative), with a confidence score for each fragment representation; performing high-level fusion to properly match the possible high-level labels and confidence scores for each fragment; and predicting the sensitive time by combining the labels of the fragments along the video timeline, indicating the moments when the content becomes sensitive.

13 Claims, 6 Drawing Sheets

(51) Int. Cl.
*G06F 17/30* (2006.01)
*H04L 29/06* (2006.01)
*H04N 21/4545* (2011.01)
*G06K 9/46* (2006.01)
*G10L 25/57* (2013.01)
*G06K 9/00* (2006.01)

(52) U.S. Cl.
CPC ....... *G06K 9/00765* (2013.01); *G06K 9/4676* (2013.01); *G06K 9/6269* (2013.01); *G10L 25/57* (2013.01); *H04L 65/60* (2013.01); *H04N 21/4545* (2013.01); *G06K 9/629* (2013.01); *G06K 9/6232* (2013.01); *G06K 9/6293* (2013.01)

(56) References Cited

U.S. PATENT DOCUMENTS

| | | |
|---|---|---|
| 2006/0111897 A1* | 5/2006 | Gemello ................ G10L 15/16 704/202 |
| 2009/0274364 A1 | 11/2009 | Shakya et al. |
| 2012/0246732 A1 | 9/2012 | Burton |
| 2013/0283388 A1 | 10/2013 | Ashok et al. |
| 2014/0207450 A1 | 7/2014 | LaVoie et al. |
| 2014/0372876 A1 | 12/2014 | Bliss et al. |
| 2016/0314380 A1* | 10/2016 | Abdulkader ............. G06K 9/66 |

\* cited by examiner

MULTIMODAL AND REAL-TIME METHOD FOR FILTERING SENSITIVE MEDIA

CROSS-REFERENCE TO RELATED APPLICATIONS

This application is a U.S. Utility Application, which claims the foreign priority benefit under 35 U.S.C. § 119 of Brazilian Patent Application No. 10 2016 007265 4, filed Apr. 1, 2016, the contents of which are incorporated herein by reference.

FIELD OF THE INVENTION

The present invention relates to a method for filtering sensitive content in a video flow (stream). More specifically, the present invention relates to a multimodal and real-time method for filtering sensitive content that uses machine-learning techniques to extract and analyze visual, auditory and/or textual of a video, resulting in an occurrence prediction sensitive content then filter them properly. The method of the present invention can be applied for filtering sensitive content in videos displayed on smart phones (smartphones), tablets, smart glasses), virtual reality devices, smart TVs (smart TVs), video cameras and the like.

BACKGROUND OF THE INVENTION

With the growth of video data generated by many devices, such as cameras, smartphones and closed-circuit televisions—CCTVs, allied with the Internet as a fast spreading venue, smart and continuous content filtering becomes paramount. In this context, classification of sensitive media content (e.g., pornography, violence, crowd) retains a considerable amount of attention because of its applications: it can be used for detecting, via surveillance cameras, inappropriate behavior; blocking undesired content from being uploaded to (or downloaded from) general purpose websites (e.g., social networks, online learning platforms, content providers, forums), or from being viewed on some places (e.g., schools, workplaces); preventing children from accessing adult content on personal computers, smartphones, smart glasses, tablets, cameras, Virtual Reality devices or smart TVs; and avoiding that improper content is distributed over phones by sexting, for instance.

Sensitive media content may be defined as any material that represents threats to its audience. Regarding digital video, the typical sensitive representatives include pornography and violence, but they may also cover disgusting scenes and other types of abstract concepts. Therefore, automatically filtering sensitive content is a hard and challenging task, because of its high-level conceptual nature.

Most of the recent approaches on classification of sensitive content are typically composed of three steps: (i) low-level visual feature extraction, (ii) mid-level feature extraction, and (iii) high-level supervised classification. The low-level features are extracted from the image pixels. They are still purely perceptual, but aim at being invariant to viewpoint and illumination changes, partial occlusion, and affine geometrical transformations. Mid-level features aim at combining the set of low-level features into a global and richer image representation of intermediate complexity. The mid-level features may be purely perceptual or they may incorporate semantic information from the classes, the former case being much more usual in the literature. Finally, the goal of supervised classification is to learn a function which assigns (discrete) labels to arbitrary images. That step is intrinsically semantic, since the class labels must be known during the training/learning phase.

Bag-of-Visual-Words (BoVW) is the most popular mid-level image representation and the most widely used for sensitive content classification problem. Inspired by the Bag-of-Words model from textual Information Retrieval, where a document is represented by a set of words, the BoVW representation describes an image as a histogram of the occurrence rate of "visual words" in a "visual vocabulary" induced by quantizing the space of a local feature (e.g., SIFT—Scale Invariant Feature Transform, SURF—Speeded Up Robust Features, HOG—Histogram of Oriented Gradients)). The visual vocabulary of k visual words, also known as visual codebook or visual dictionary, is usually obtained by unsupervised learning (e.g., k-means clustering algorithm) over a sample of local descriptors from the training/learning data.

The BoVW representation has important limitations (such as quantization error, spatial information loss), and several alternatives have been developed. One of the best mid-level aggregate representations currently reported in the literature, the Fisher Vector is based upon the use of the Fisher kernel framework with Gaussian mixture models (GMM) estimated over the training/learning data. For sensitive media content classification, no commercial solutions took advantage from that tip-top mid-level aggregate representation.

Other approaches have employed audio features (e.g., MFCC—Mel-frequency Cepstral Coefficients, loudness, pitch) to improve the classification of sensitive videos. The addition of audio analysis to the context of sensitive media detection can be critical to detect challenging cases, which can be a lot harder using visual features only (e.g., breast-feeding, hentai movies, gun shots). In addition, most of the visual local descriptors are static (i.e., it does not take into account temporal information). Audio features, in the other hand, are purely temporal, since no spatial information is available to be analyzed. Therefore, audio features can overcome static visual descriptors when the nature of the sensitive content is fundamentally temporal (e.g., blows in a fight). However, in the context of sensitive media analysis, the audio information should only be used along with the visual information. The audio features alone can be misleading and unreliable since it often does not correspond to what is being visually displayed. It is very common, for example, in movies, where there is plenty of background music which sometimes overlaps the action that is going on visually. Despite its importance and faster processing time, no commercial solutions took advantage from the audio information.

In addition, some approaches are based on multimodal fusion, exploiting both auditory and visual features. Usually, the fusion of different modalities is performed at two levels: (i) feature level or early fusion, which combines the features before classification and (ii) decision level or late fusion, which combines the scores from individual classifier models.

The feature level fusion is advantageous in that it requires only one learning phase on the combined feature vector. However, in this approach it is hard to represent the time synchronization between the multimodal features. In addition, the increase in the number of modalities makes it difficult to learn the cross-correlation among the heterogeneous features.

The strategy of the decision level fusion has many advantages over feature fusion. For instance, unlike feature level fusion, where the features from different modalities (e.g., audio and visual) may have different representations, the decisions (at the semantic level) usually have the same representation. Therefore, the fusion of decisions becomes easier. Moreover, the strategy of the decision level fusion offers scalability in terms of the modalities used in the fusion process, which is difficult to achieve in the feature level fusion. Another advantage of late fusion strategy is that it allows us to use the most suitable methods for analyzing each single modality, such as hidden Markov model (HMM) for audio and support vector machine (SVM) for image. This provides much more flexibility than the early fusion.

The method of the present invention relies on multimodal fusion of visual, auditory, and textual features for a fine-grained classification of sensitive media content in video snippets (short temporal series of video frames).

Patent document US 2013/0283388 A1, titled "Method and system for information content validation in electronic devices", published on Oct. 24, 2013 by SAMSUNG ELECTRONICS CO., LTD, proposes a method and system for content filtering in mobile communication devices. An eventual similarity with the method of the present invention is the fact that the method of document US 2013/0283388 analyzes the information content—including image, video and audio information in real-time. However, this approach does not go into details. For example, for analyzing image/video content, the authors only mentioned that an image analysis engine comprises an "Image and Video Filtering module from IMAGEVISION located at Anna, Tex., 75409, U.S.A". Nothing is specified in document US 2013/0283388 for analyzing audio information. Moreover, in contrast with the present invention, US 20130283388 does not fuse information for classification and it does not classify sensitive content within a video timeline.

Patent document US 2012/0246732 A1, titled "Apparatus, Systems and Methods for Control of Inappropriate Media Content Events", published on Sep. 27, 2012, by BURTON DAVID ROBERT, proposes systems and methods to prevent presentation of inappropriate media content. The media content analysis logic of document US 2012/0246732 A1 may comprise the audio recognition logic, the object recognition logic, the text recognition logic, and/or the character recognition logic. However, it is not clear how sensitive content is analyzed. The method of the present invention exploits and evaluates a plurality of different characteristics (i.e., fuse information), and also classifies sensitive content within a video timeline, in contrast to the method proposed in document US 2012/0246732.

Patent document US 2009/0274364 A1 titled "Apparatus and Methods for Detecting Adult Videos" proposes apparatus and methods for analyzing video content to determine whether a video is adult or non-adult. Using a key frame detection system, the method of document US 2009/0274364 generates one or more models for adult video detection. According to the inventors, any suitable key frame features may be extracted from each key frame—17 image/video analysis techniques are described (including spatial and/or color distribution features and texture features). One drawback related to the present invention is that such techniques are typically not robust to the changes in video resolution, frame rate, cropping, orientation, or lighting. Differently, the method in the present invention proposes an end-to-end BoVW-based framework, which preserves more information while keeping the robustness to different changes in video. Moreover, in contrast with the present invention, document US 2009/0274364 does not use audio and/or textual content, does not fuse information and it does not classify sensitive content within a video timeline.

Patent document U.S. Pat. No. 8,285,118 B2 titled "Methods and Systems for Media Content Control", published on Jan. 14, 2010, by NOVAFORA, INC, proposes methods and systems to control the display of media content on media player. The video media content is analyzed by extracting only visual information—local feature descriptors, such as SIFT, spatio-temporal SIFT, or SURF descriptors. An eventual similarity with the method of the present invention is the fact that U.S. Pat. No. 8,285,118 method computes the video signature using a BoVW-based mid-level representation. However, while U.S. Pat. No. 8,285,118 proposes to match the BoVW signatures to a database of signatures (it is time consuming and it is not generalizable), the present invention proposes to classify video signatures according a mathematical model learned from the training/learning dataset (it is very fast processing and it is generalizable). Furthermore, in contrast with the present invention, document U.S. Pat. No. 8,285,118 does not use audio and/or textual content and does not fuse information.

Patent document US 2014/0372876 A1 titled "Selective Content Presentation Engine", published on Dec. 18, 2014, by AMAZON TECHNOLOGIES, INC, proposes a method for suppressing content portion (e.g., audio portions that include profane language, video portions that include lewd or violent behavior, etc.) at an electronic device. In document US 2014/0372876 A1, the selective content presentation engine may determine whether the content portion is to be presented by the electronic device based on the user preferences using visual or audio recognition. However document US 2014/0372876 A1 only mentioned the different types of classifiers that recognize images or audio segments and, it is not mentioned how the visual or audio content may be analyzed. In contrast with the present invention, US 20140372876 does not fuse information and it does not use mid-level aggregate representation.

Patent document US 2014/0207450 A1 titled "Real-time Customizable Media Content Filter", published on Jul. 24, 2014, by INTERNATIONAL BUSINESS MACHINES CORPORATION, proposes a method for content filtering (e.g., violence, profanity) in real-time, with customizable preferences. Textual information, extracted from subtitles, closed caption and audio stream, is analyzed by matching textual content with one or more blacklist table entries. Differently, the proposed method in the present invention analyzes textual content using a robust BoW-based framework. Additionally, the present invention uses visual information, fuse information, and classifies sensitive content within a video timeline.

Patent document US 2003/0126267 A1 titled "Method and Apparatus for Preventing Access to Inappropriate Content Over a Network Based on Audio or Visual Content", published on Jul. 3, 2003, by KONINKLIJKE PHILIPS ELECTRONICS N.V, proposes a method and apparatus for restricting access to electronic media objects having objectionable content (such as nudity, sexually explicit material, violent content or bad language), based on an analysis of the audio or visual information. For example, image processing, speech recognition or face recognition techniques may be employed to the identified inappropriate content. In contrast with the present invention, document US 2003/0126267 does not fuse information, does not use mid-level aggregate representation, and it does not classify sensitive content within a video timeline.

Finally, patent document CN 104268284 A titled: "Web Browse Filtering Soft dog Device Special for Juveniles", published on Jan. 4, 2015, by HEFEI XINGFU INFORMATION TECHNOLOGY CO., LTD, provides a web browser filtering softdog (USB dongle) device which comprises a pornographic content analysis module. As defined in document CN 104268284, pornographic content analysis unit includes a text analysis module, image analysis module and video analysis module. However, it is not clear how pornographic content is analyzed. Furthermore, in contrast with the present invention, CN 104268284 does not use audio content, it does not fuse information, it does not use mid-level aggregate representation and it does not classify sensitive content within a video timeline.

In the following, it is summarized the scientific papers for the two most important types of sensitive content considered in this invention, pornography and violence.

Pornography Classification

The first efforts to detect pornography conservatively associated pornography with nudity, whereby the solutions tried to identify nude or scantily-clad people (Paper "*Automatic detection of human nudes*", D. Forsyth and M. Fleck, International Journal of Computer Vision (IJCV), vol. 32, no. 1, pp. 63-77, 1999; Paper "*Statistical color models with application to skin detection*", M. Jones and J. Rehg, International Journal of Computer Vision (IJCV), vol. 46, no. 1, pp. 81-96, 2002; Paper, "*Naked image detection based on adaptive and extensible skin color model*", J.-S. Lee, Y.-M. Kuo, P.-C. Chung, and E.-L. Chen, Pattern Recognition (PR), vol. 40, no. 8, pp. 2261-2270, 2007.). In such works, the detection of human skin played a major role, followed by the identification of body parts.

The presence of nudity is not a good conceptual model of pornography. There are non-pornographic situations with plenty of body exposure. Conversely, there are pornographic scenes that involve very little exposed skin. Nevertheless, nudity detection is related to pornography detection, with a vast literature of its own.

The clear drawback of using skin detectors to identify pornography is the high false-positive rate, especially in situations of non-pornographic body exposure (e.g., swimming, sunbathing, boxing). Therefore, Deselaers et al. (Paper "*Bag-of-visual-words models for adult image classification and filtering*", T. Deselaers, L. Pimenidis, and H. Ney, in International Conference on Pattern Recognition (ICPR), pp. 1-4, 2008) proposed, for the first time, to pose pornography detection as a Computer Vision classification problem (similar to object classification), rather than a skin-detection or segmentation problem. They extracted patches around difference-of-Gaussian interest points, and created a visual codebook using a Gaussian mixture model (GMM), to classify images into different pornographic categories. Their Bag-of-Visual-Words (BoVW) model greatly improved the effectiveness of the pornography classification.

More recently, Lopes et al. developed a Bag-of-Visual-Words (BoVW) approach, which employed the HueSIFT color descriptor, to classify images (Paper "*A bag-of-features approach based on hue-SIFT descriptor for nude detection*", A. Lopes, S. Avila, A. Peixoto, R. Oliveira, and A. Araujo, in European Signal Processing Conference (EUSIPCO), pp. 1152-1156, 2009) and videos (Paper "*Nude detection in video using bag-of-visual-features*", A. Lopes, S. Avila, A. Peixoto, R. Oliveira, M. Coelho, and A. Araujo, in Conference on Graphics, Patterns and Images (SIBGRAPI), pp. 224-231, 2009) of nudity. For video classification, they proposed a majority-voting scheme over the video frames. Similar to Dewantono and Supriana (Paper "*Development of a real-time nudity censorship system on images*", S. Dewantono and I. Supriana, in International Conference on Information and Communication Technology (IcoICT), pp. 30-35, 2014) proposed aBoVW-based image/video nudity detection by using a skin filtering method and SVM classifiers.

By moving from nudity detection towards pornography classification, it arises the challenge in defining the notion of pornography. Many scientific papers have adopted the definition of pornography proposed by Short et al. (Paper "*A review of internet pornography use research: methodology and content from the past 10 years*", M. Short, L. Black, A. Smith, C. Wetterneck, and D. Wells, Cyberpsychology, Behavior, and Social Networking, vol. 15, no. 1, pp. 13-23, 2012): "any explicit sexual matter with the purpose of eliciting arousal", which while still subjective, establishes a set of criteria that allow deciding the nature of the material (sexual content, explicitness, goal to elicit arousal, purposefulness).

Avila et al. proposed an extension to BoVW formalism, BossaNova (Paper "*Pooling in image representation: the visual codeword point of view*", S. Avila, N. Thome, M. Cord, E. Valle, and A. Araujo, Computer Vision and Image Understanding (CVIU), vol. 117, pp. 453-465, 2013), with HueSIFT descriptors to classify pornographic videos using majority voting. Recently, Caetano et al. (Paper "*Representing local binary descriptors with BossaNova for visual recognition*", C. Caetano, S. Avila, S. Guimarães, and A. Araujo, in Symposium on Applied Computing (SAC), pp. 49-54, 2014) achieved similar results by using BossaNova, binary descriptors, and majority voting. In (Paper "*Pornography detection using BossaNova video descriptor*", in European Signal Processing Conference (EUSIPCO), pp. 1681-1685, 2014), Caetano et al. improved their previous results by establishing a single bag for the entire target video, instead of a bag for each extracted video frame. A possible similarity to the method of the present invention is the fact that the method of Gaetano et al. calculates the signature using a mid-level video representation based on BoVW. However, while Gaetano et al. proposes the use of BossaNova representation of mid-level video—which extends BoVW method offering more pooling operation of information maintenance based on a distribution of the distance to the keyword, the present invention proposes applying the representation of the Fisher vector—one of the best mid-level aggregated representations currently described in the literature, which extends the BoVW method to encode the first and second order mean differences among the local descriptors and codebook elements. It is important to mention that to the best of our knowledge, for sensitive media content rating, there are no commercial solutions that use this best mid-level representation. Additionally, this article "*Pornography Detection Using BossaNova Video Descriptor*" does not have most of the advantages offered by the proposed solution of the present invention: while the method of Caetano et al. detects pornographic content only, the present invention proposes a unified and easy structure for extending to handle any kind of sensitive content; while the method of Gaetano et al focuses only on the visual signal, the present invention provides a method of high level multimodal fusion exploring auditory, visual and/or textual features; while the method of Gaetano et al. classifies pornographic content in the video as a whole, the present invention proposes a fine-tuning method of classifying sensitive media content in video fragments (small parts or series short time of video frames). Furthermore, in contrast to the present invention, the method of Caetano et al. cannot be performed in real-time nor on mobile platforms.

Some prior art works rely on bags of static features. Few works have applied space-temporal features or other motion information for the classification of pornography. Valle et al. (Paper "*Content-based filtering for video sharing social networks*", E. Valle, S. Avila, F. Souza, M. Coelho, and A. Araujo, in Brazilian Symposium on Information and Computational Systems Security (SBSeg), pp. 625-638, 2012) proposed the use of space-temporal local descriptors (such as STIP descriptor), in a BoVW-based approach for pornography classification. In the same direction, Souza et al. (Paper "*An evaluation on color invariant based local spatiotemporal features for action recognition*", F. Souza, E. Valle, G. Camara-Chavez, and A. Araujo, in Conference on Graphics, Patterns and Images (SIBGRAPI), pp. 31-36, 2011) improved Valle et al.'s results by applying ColorSTIP and HueSTIP, color-aware versions of the STIP detector and descriptor, respectively. Both works established a single bag for the entire target video, instead of keeping a bag for each video frame, prior to voting schemes.

Very recently, M. Moustafa (Paper "*Applying deep learning to classify pornographic images and videos*", M. Moustafa, in Pacific-Rim Symposium on Image and Video Technology (PSIVT), 2015) proposed a deep learning system that analyzes video frames to classify pornographic content. This work focused on the visual cue only and applied a majority-voting scheme.

In addition, other approaches have employed audio analysis as an additional feature for the identification of pornographic videos. Rea et al. (Paper "*Multimodal periodicity analysis for illicit content detection in videos*", N. Rea, G. Lacey, C. Lambe, and R. Dahyot, in European Conference on Visual Media Production (CVMP), pp. 106-114, 2006) combined skin color estimation with the detection of periodic patterns in a video's audio signal. Liu et al. (Paper "*Fusing audio-words with visual features for pornographic video detection*", Y. Liu, X. Wang, Y. Zhang, and S. Tang, in IEEE International Conference on Trust, Security and Privacy in Computing and Communications (TrustCom), pp. 1488-1493, 2011) demonstrated improvements by fusion visual features (color moments and edge histograms) with "audio words". In a similar fashion, Ulges et al. (Paper "*Pornography detection in video benefits (a lot) from a multi-modal approach*", A. Ulges, C. Schulze, D. Borth, and A. Stahl, in ACM International Workshop on Audio and Multimedia Methods for Large-scale Video Analysis, pp. 21-26, 2012) proposed an approach of late fusion motion histograms with audio words.

In addition to those scientific results, there are commercial software packages that block web sites with pornographic content (e.g., K9 Web Protection, CyberPatrol, NetNanny). Additionally, there are products that scan a computer for pornographic content (e.g., MediaDetective, Snitch Plus, NuDetective). MediaDetective and Snitch Plus are off-the-shelf products that rely on the detection of human skin to find pictures or movies containing nude people. The work of Polastro and Eleuterio (a.k.a., NuDetective, Paper "*NuDetective: A forensic tool to help combat child pornography through automatic nudity detection*", M. Polastro and P. Eleuterio, in Workshop on Database and Expert Systems Applications (DEXA), pp. 349-353, 2010) also adopts skin detection, and it is intended for the Federal Police of Brazil, in forensic activities.

Violence Classification

Over the last few years, progress in violence detection has been quantifiable thanks to the MediaEval Violent Scenes Detection (VSD) task, which provides a common ground truth and standard evaluation protocols. MediaEval is a benchmarking initiative dedicated to evaluate new algorithms for multimedia access and retrieval. Organized annually from 2011 to present, the MediaEval VSD task poses the challenge of an automated detection of violent scenes in Hollywood movies and web videos. The targeted violent scenes are those "one would not let an 8 years old child see in a video because they contain physical violence".

The violence detection pipeline is typically composed of three steps: (i) low-level feature extraction from audio, visual or textual modalities, (ii) mid-level feature extraction using bag-of-visual-words (BoVW) representation or extensions, and (iii) supervised classification by employing support vector machines (SVM), neural networks, or hidden Markov models (HMM).

In the 2014 edition of the VSD task, for instance, all proposed techniques employed this three-step pipeline, except for one team, which used the provided violence-related concept annotations as mid-level features. In the low-level step, most of the approaches explored both auditory (e.g., MFCC features) and visual information (e.g., dense trajectories). Avila et al. (Paper "*RECOD at MediaEval 2014: Violent scenes detection task*", S. Avila, D. Moreira, M. Perez, D. Moraes, I. Cota, V. Testoni, E. Valle, S. Goldenstein, and A. Rocha, in Working Notes Proceedings of the MediaEval 2014 Workshop, 2014) additionally incorporated textual features extracted from the Hollywood movie subtitles. In the mid-level step, the low-level features were frequently encoded using a Fisher Vector representation. Finally, in the last step, SVM classifiers were the most used for classification.

Before the MediaEval campaign, several methods were proposed to detect violent scenes in video. However, due to the lack of a common definition of violence, allied with the absence of standard datasets, the methods were developed for a very specific type of violence (e.g., gunshot injury, war violence, car chases) and, consequently, the results were not directly comparable. In the following, we overview some of those works for the sake of completeness.

One of the first proposals for violence detection in video was introduced by Nam et al. (Paper "*Audio-visual content-based violent scene characterization*", J. Nam, M. Alghoniemy, and A. Tewk, in International Conference on Image Processing (ICIP), pp. 353-357, 1998). They combined multiple audio-visual features to identify violent scenes in movies, in which flames and blood are detected using a predefined color tables, and sound effects (e.g., beatings, gunshots, explosions) are detected by computing the energy entropy. This approach of combined low-level features with specialized detectors for high-level events (such as flames, explosions and blood) is also applied by paper "*A multimodal approach to violence detection in video sharing sites*", T. Giannakopoulos, A. Pikrakis, and S. Theodoridis, in International Conference on Pattern Recognition (ICPR), pp. 3244-3247, 2010; Paper "*Violence detection in movies with auditory and visual cues*", J. Lin, Y. Sun, and W. Wang, in International Conference on Computational Intelligence and Security (ICCIS), pp. 561-565, 2010.

Although most of the approaches on violence detection is multimodal, previous works (before MediaEval) have mainly focused on single modalities. For instance, using motion trajectory information and orientation information of a person's limbs, Datta et al. (Paper "*Person-on-person violence detection in video data*", A. Datta, M. Shah, and N. Lobo, in International Conference on Pattern Recognition (ICPR), pp. 433-438, 2002) addressed the problem of detecting human violence such as first fighting and kicking. Nievas et al. (Paper "*Violence detection in video using computer vision techniques*", E. B. Nievas, O. D. Suarez, G. B. Garca, and R. Sukthankar, in International Conference on Computer Analysis of Images and Patterns (CAIP), pp. 332-339, 2011) employed a BoVW framework with MoSIFT features to classify ice hockey clips. By exploiting audio features, Cheng et al. (Paper "*Semantic context detection based on hierarchical audio models*", W.-H. Cheng, W.-T. Chu, and J.-L. Wu, in International Workshop on Multimedia Information Retrieval (MIR), 190-115, 2003) recognized gunshots, explosions and car-braking using a hierarchical approach based on GMM and HMM. Pikrakis et al. (Paper "*Gunshot detection in audio streams from movies by means of dynamic programming and bayesian networks*", A. Pikrakis, T. Giannakopoulos, and S. Theodoridis, in IEEE International Conference on Acoustics, Speech and Signal Processing (ICASSP), pp. 21-24, 2008) proposed a gunshot detection method based on statistics of audio features and Bayesian networks.

SUMMARY OF THE INVENTION

The present invention refers to a fine-grained classification method of sensitive media content in video snippets (short temporal series of video frames). The invention classifies video snippets in sensitive (a.k.a, positive, i.e., unsafe for disclosure) or non-sensitive (a.k.a., negative, i.e., safe for disclosure), according to the hints extracted from multiple modalities of video features:

1. Visual features (e.g., the amount of light that was incident on the pixels of the frames, at the moment of capture).
2. Auditory features (e.g., soundtrack and special effects).
3. Textual features (e.g., subtitles and closed caption).

The method execution requires two phases: offline or online. Initially, in the offline operation, a mathematical model is statistically learned from the training/learning dataset. This model is able to separate the positive samples from the negative ones, in a generalizable manner (i.e., the model is able to predict the class of unknown video samples with a high accuracy). The offline operation receives the training dataset as input, and it outputs the statistically learned mathematical model. It is supposed to be executed only a few times (whenever the training/learning dataset is updated).

In the online operation, an unknown video sample is input to the method, together with the mathematical model. The model is thus used to predict the moments the input video becomes inappropriate for disclosure (i.e., the moments its content becomes sensitive). The online operation must be performed every time a new unknown video is presented to the method, and it may be executed locally on the target electronic devices (e.g., smartphones, tablets, smart glasses, Virtual Reality devices and smart TVs). There is no need to send or retrieve data from a remote server during the online operation.

The novel and differential points of the present method rely on the following issues:

1. Unified and easy-to-extend framework: The method of the present invention defines a universal protocol for dealing with any type of sensitive content, in other words, it does not work exclusively for a particular sensitive media content (e.g., only pornography, or only violence), it can be extended to some other content-filtering approaches.
2. Detection and localization of sensitive content in video snippets faster than real-time: The method of the present invention performs a fine-grained classification of sensitive media content in video snippets. It does not only output whether a video has sensitive content, but it also outputs the localization of the sensitive content within the video timeline.
3. Powerful mid-level video snippet representations: The method of the present invention employs powerful mid-level representations to encode the video snippets, as a manner to reduce the semantic gap between the low-level content representation (e.g., frame pixels, audio signals), and the high-level target concept (e.g., pornography, violence).
4. High-level fusion of characterization and classification methods: As aforementioned, the method of the present invention analyzes visual, auditory, and textual video features, to classify its content. The features are analyzed independently, and then fused in a novel decision method, that is statistically learned from the training dataset. This fusion method allows the selection of diverse low-level feature descriptors (e.g., SIFT or SURF image descriptors, MFCC audio descriptor), and even the add-in of yet-to-be-developed future descriptors, in a very seamless way.
5. Robustness to small sample sized (SSS) problems: The method of the present invention can be learned with just a few hours of video footage, keeping the generalization ability of the learned model to classify examples never seen by the learning algorithm during training phase.
6. Large-scale content analysis: The method of the present invention can be embodied as software that may run on plenty of platforms. If one disposes of enough computational power, the solution can analyze thousands of video samples at the same time, therefore attending eventually high demands of Internet applications.
7. Deployable into low-powered devices (e.g., smartphones, tablets, smart TVs, smart glasses, Virtual Reality devices, Etc.) with Complete Local Execution: The method of the present invention can be performed into low-powered devices, i.e., the end-to-end framework can be effectively executed in place (locally), without sending and retrieving data from the cloud (remotely).
8. Low memory, storage space, and computational footprint: The method of the present invention is susceptible of embodiments that purposely employ, in each step, only solutions that present low memory usage and low computational footprint, yet maintaining acceptable classification accuracy. Examples may comprise, but are not limited to, the use of fast video descriptors, and/or cheap mid-level aggregation representations, and/or small data classifiers. Besides, a storage space of up to 1.5 MB is suitable to locally store the prediction models and detect sensitive content in real-time.
9. No ad-hoc preprocessing: The method of the present invention does not require any specific environment-, content- or capture-dependent preprocessing of the videos to be analyzed. It works for different video resolutions, frame rates, orientations, or lightings.
10. No human supervision: The method of the present invention is entirely executed with no need of human supervision. It eliminates the necessity of hiring employees for the tedious task of content supervision, which depending on the kind of suppressed material, may indeed be upsetting.

The previously mentioned objectives are achieved by a method for filtering sensitive content, which receives as input a digital video stream, comprising the following steps:

segmenting the digital video into video fragments along the video timeline;

extracting the features containing significant information from the input digital video on sensitive media;

reducing the semantic difference between each of the low level video features, and high level sensitive concept;

classifying video fragments issuing a positive or negative high-level label, with a confidence score for each fragment representation;

high-level fusing to deeply combine the possible high-level labels and confidence scores for each fragment; and predicting the sensitive time by combining the labels of the fragments along the video timeline, indicating the times when the content becomes sensitive.

The method of the present invention goes beyond the existing solutions in the prior art, by proposing new efficient and effective characterization techniques for sensitive media analysis. The present invention discloses a classification method for sensitive media without using the trivial approach based on skin detection, detecting and localizing sensitive content in real-time, on low-powered devices (e.g., smartphones, tablets, smart glasses, Virtual Reality devices, smart TVs, cameras), using low memory and computational footprint. It presents better efficiency and performance than current/existing solutions for sensitive (pornography and/or violence) media analysis.

As will be detailed, the method has a classification accuracy higher than 90% for pornography, higher than 80% for violence, and the analysis takes less than one second per analyzed frame in a mobile platform (which has computational/hardware restrictions). The method does not require the analysis of all frames in the video in order to reach its high accuracy. Just one frame must be analyzed per second. For instance, if the video has 30 or 60 frames per second, the required rate of frames to be analyzed is 1 every 30 or 60 frames. Therefore, in real-time execution, the analysis time is always lesser than video timeline.

BRIEF DESCRIPTION OF THE DRAWINGS

The objectives and advantages of the present invention will become clearer through the following detailed description of the example and non-limitative figures presented at the end of this document, wherein.

DETAILED DESCRIPTION OF THE INVENTION

The following description is presented to enable any person skilled in the art to make and to use the embodiments, and is provided in the context of particular applications and their requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features herein disclosed.

Figure 4:
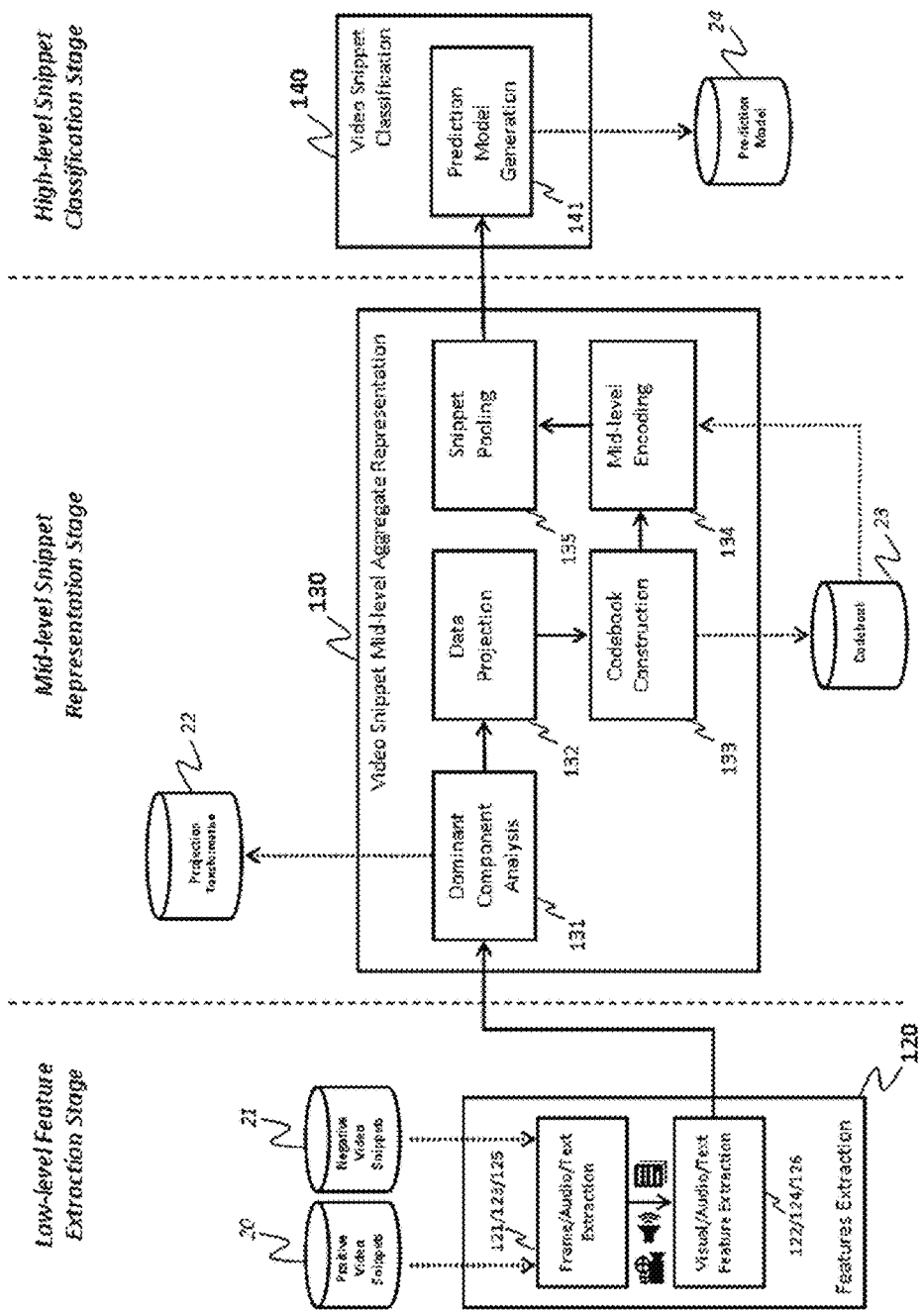
FIG. 4 is a flowchart that depicts the offline operation of the present invention, which corresponds to the training phase of the method.
Figure 5:
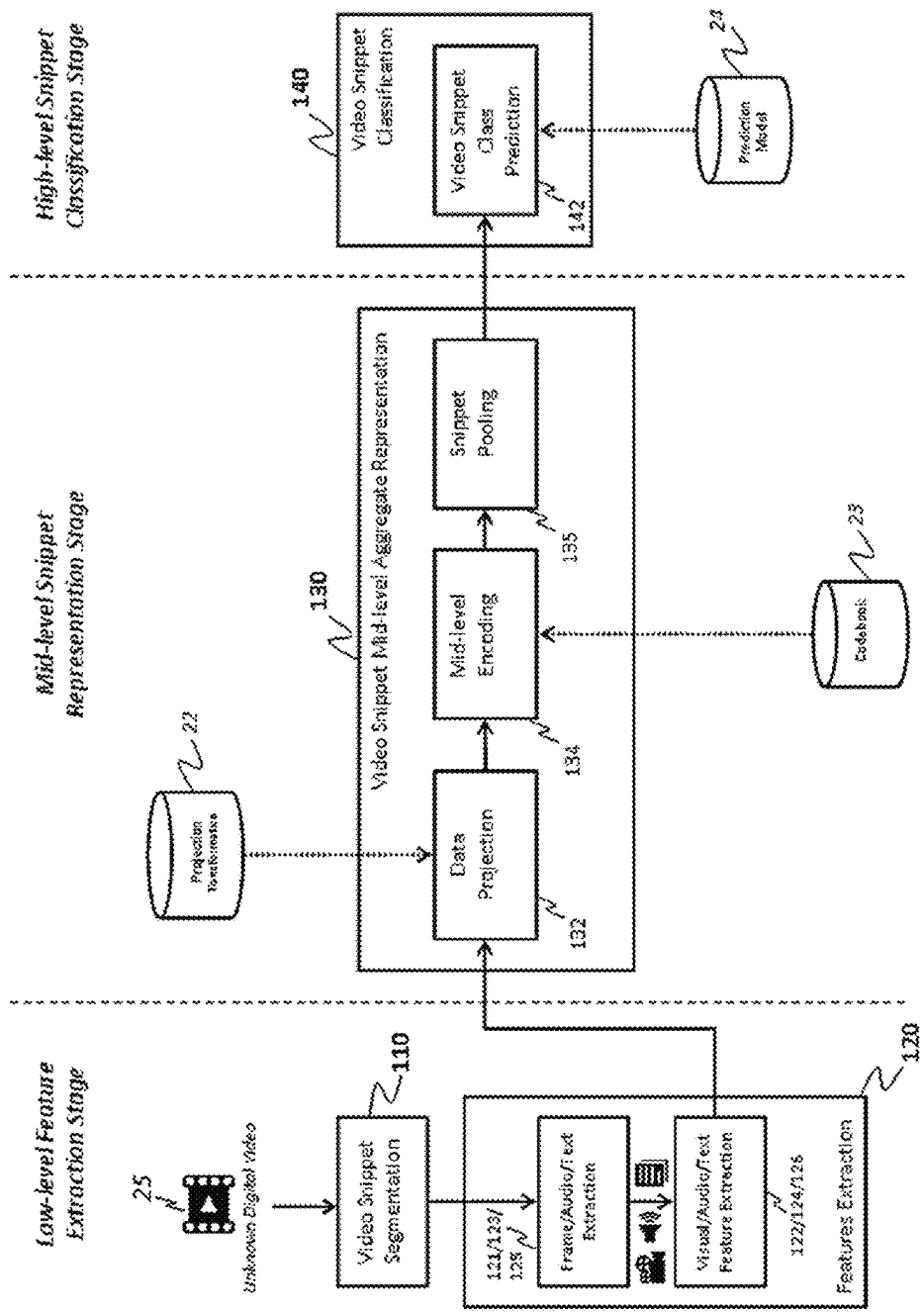
FIG. 5 is a flowchart that depicts the online operation (connected) according to an embodiment of the proposed invention, which corresponds to the execution phase (regular use) of the method.
Figure 6:
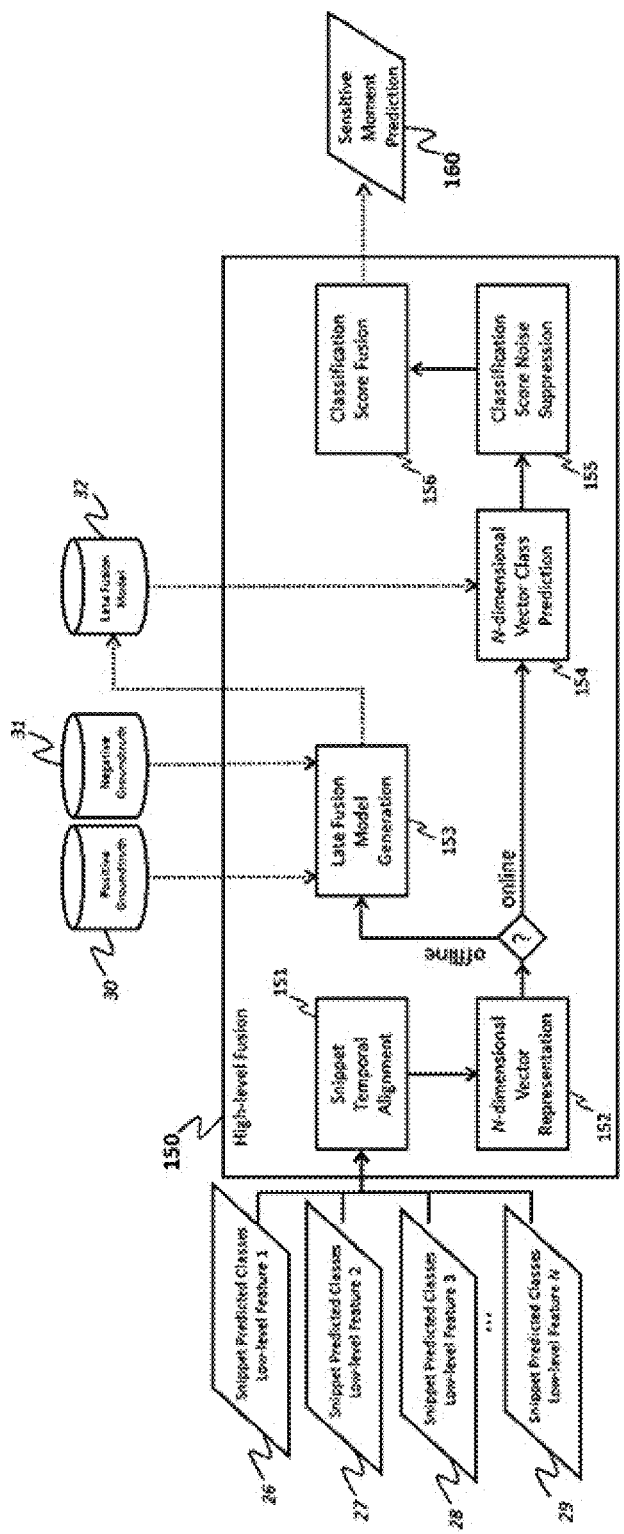
FIG. 6 is a flowchart that depicts the high-level fusion solution according to an embodiment of the proposed invention.

The detailed description of the present invention follows a top-down approach. Hence, we start with the disclosure of two sample embodiments (FIGS. 1 and 2), to clarify the purpose of the invention. In the sequence, we depict an overview of the proposed method (FIG. 3), and then we delve into the details of the offline and online operations for each type of extracted low-level features (visual, auditory, and textual) (FIGS. 4 and 5). In the end, we explain the high-level technique of fusion (FIG. 6).

Figure 1:
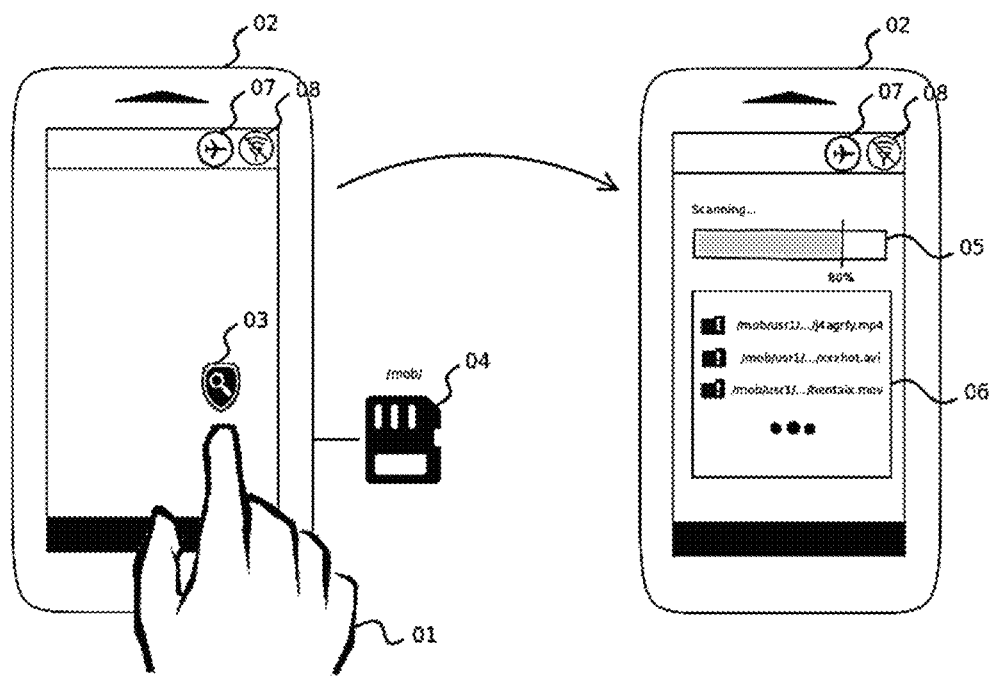
FIG. 1 is a flowchart that depicts a sample embodiment of the present invention on a smartphone.

FIG. 1 is a flowchart that depicts a possible embodiment of the present invention. The solid arrow represents the sequence of events (2) within the embodiment execution.

The action starts with a user 1 using her smartphone 2, where a system implementing the proposed invention was previously deployed in the form of a scanning app 3. The app locates all the video files stored in the device and additional videos that can be stored in memory cards 4, and starts scanning them to identify which files present sensitive content (e.g., violence, pornography).

The progress of the file scanning can be checked by the means of a progress bar 5, and the sensitive videos are iteratively enlisted 6. One can note that the smartphone 2 may stay offline during the entire scanning process (what is shown by the means of flight mode 7 and no wireless connections 8). It means that the scanning and sensitive content detection processes are performed locally, with no need of additional processing steps in external or remote machines, despite eventual memory and processing restrictions of the smartphone.

In the process of sensitive video detection, visual, auditory and/or textual features are extracted from the video files, to support the app execution.

Figure 2:
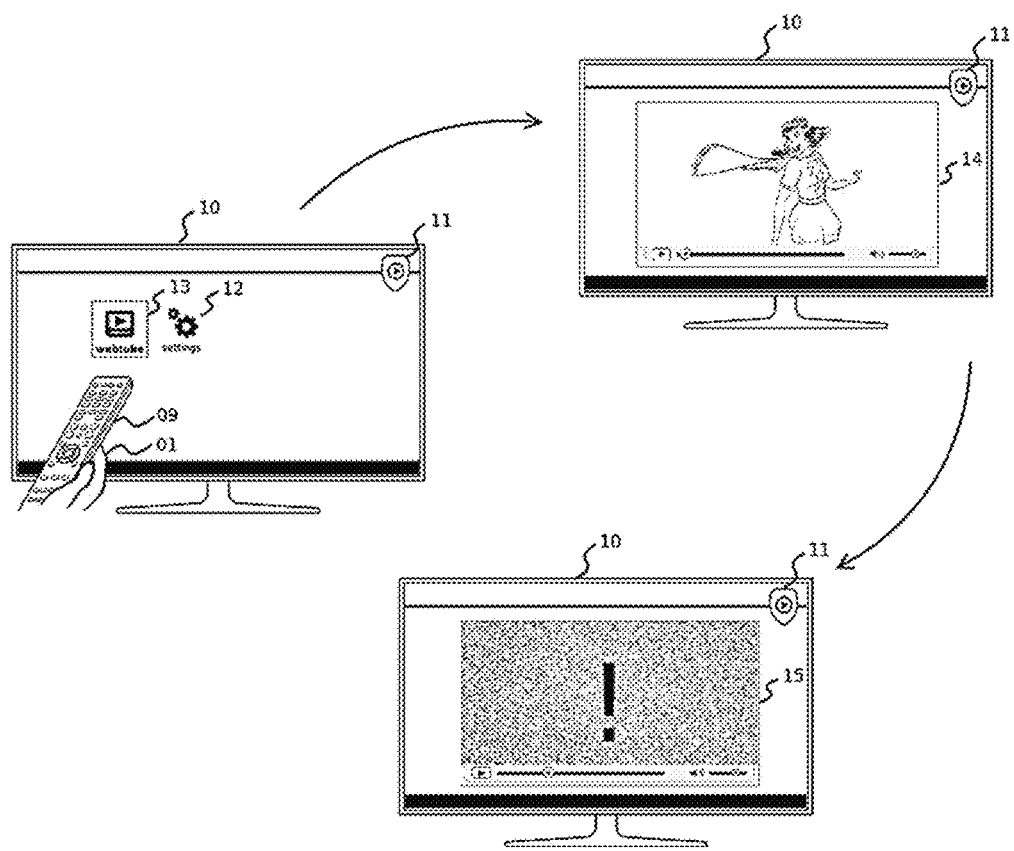
FIG. 2 is a flowchart that depicts a sample embodiment of the present invention on a Smart TV.

FIG. 2 is a flowchart that depicts another possible embodiment of the present invention. The solid arrows represent the sequence of events (3) within the embodiment execution.

The action starts with a user 1 operating her Smart TV 10 with a regular remote control 9. The equipment runs under a kid's safe mode (represented by a proper status icon 11). When activated, the kid's safe mode provides—as a background service a real-time analysis of every video stream that the TV is demanded to play. The kid's safe mode can be activated and deactivated by the means of the TV settings 12 or by a "Safe mode button/function" in the remote control 9, and it runs locally, with no need of connections to remote servers or external databases.

The user 1 chooses to watch a regular web video stream 13, what leads to a video content being played 14. Given that the TV is under safe mode, the video content is always analyzed before disclosure, in a manner that is transparent to the user. Without any human supervision or awareness, whenever the video becomes sensitive, the visual and auditory contents are censored on demand 15.

In the process of sensitive content detection, visual, auditory and/or textual features are extracted from the video streams, to support the service execution.

Figure 3:
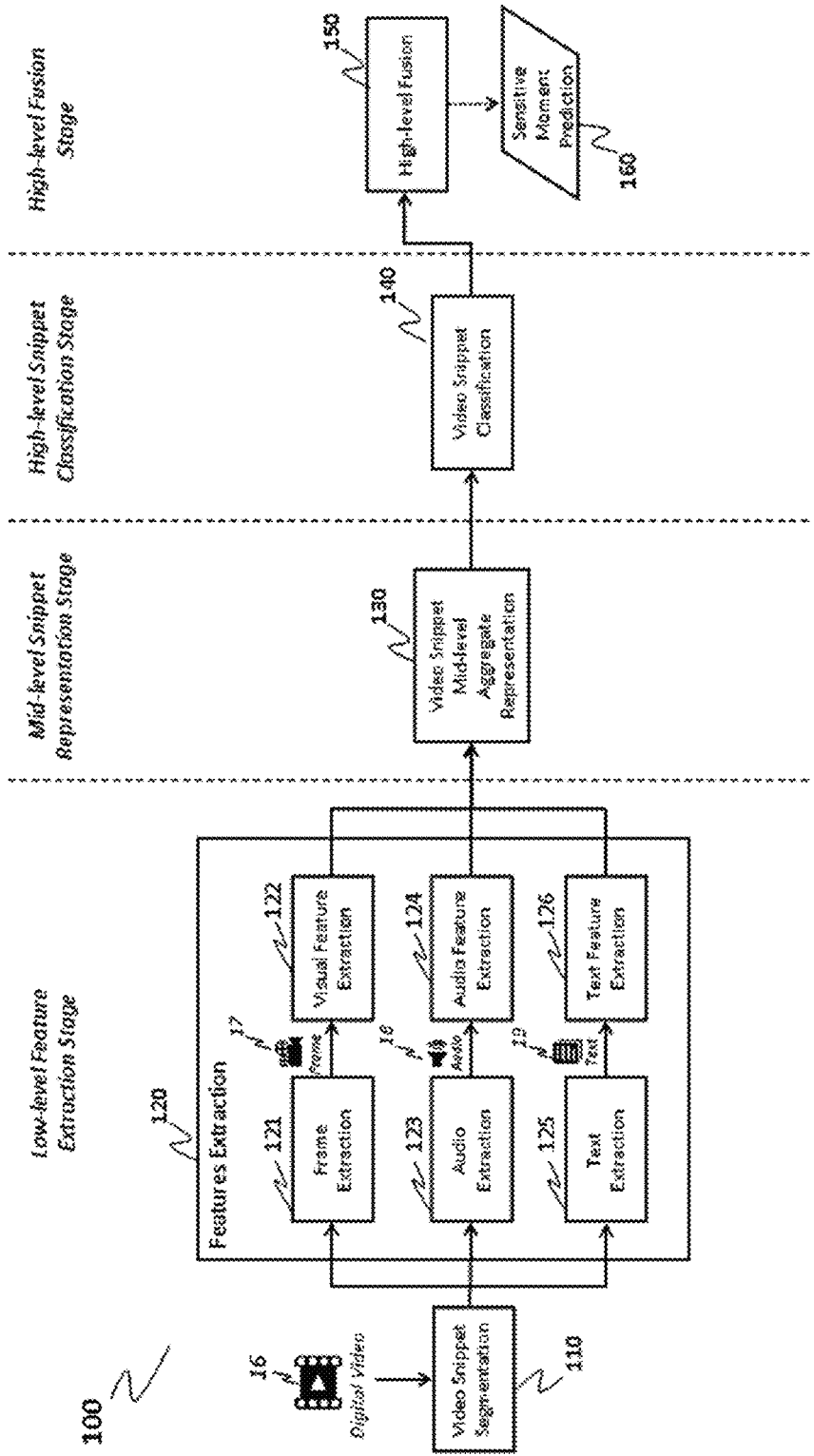
FIG. 3 is a flowchart that depicts the overview operation of the present invention.

FIG. 3 is a flowchart that depicts the overview operation of the method of the present invention. Each rectangular box is an activity, and the arrows represent the precedence of activities. Some activities are interleaved by black icons 16, 17, 18 and 19, that put in evidence the type of data that shall flow between the activities. Dashed arrows represent a simple flow of data, and a parallelogram represents output.

Regardless of being offline or online, the method operation 100 starts from the Digital Video file or stream 16, which is segmented in video snippets along the video timeline. These snippets may have fixed or varied temporal length, and they may or may not present temporal overlap.

Once the snippets are produced by the Video Snippet Segmentation activity 110, then Features Extraction activity 120 is performed, in order to generate a set of features (a.k.a. "feature vectors") which contains the significant information from the input data (i.e., the Digital Video 16) regarding sensitive media. Each one of the snippets is subject to three types of low-level Feature Extraction 120:

1. Visual Feature Extraction 122 regards the processes that analyze the Frames 17 of the video snippets, previously extracted by Frame Extraction 121. These processes include any type of global or local still-image description method, interest point descriptor, or space-temporal video description solution that may be available to the method embodiment.

2. Auditory Feature Extraction 124 is related to the processes that analyze the Audio 18 of the video snippets, previously extracted by Audio Extraction 123. These processes include any type of audio description solution (e.g., MFCC) that may be available to the method embodiment.

3. Textual Feature Extraction 126 concerns the processes that analyze any Text 19 that may be associated to a video snippet (e.g., subtitles and closed caption), previously extracted by Text Extraction 125. These processes include any type of text description solution (e.g., stem frequency, etc.) that may be available to the method embodiment.

The activities of feature extraction 120, and more specifically items 122, 124, and 126 conclude the low-level stage of the proposed method (Low-level Feature Extraction stage, in FIG. 3).

In the sequence, each possible process of low-level feature extraction follows an independent path through the Video Snippet Mid-level Aggregate Representation 130, which is responsible for reducing the semantic gap that exists between each one of the low-level video features, and the high-level sensitive concept. For doing so, it constitutes the mid-level stage of the method operation (Mid-level Video Snippet Representation stage, in FIG. 3). More details on the mid-level representation (130) are given in FIGS. 4 and 5, which will be further explained.

The Video Snippet Classification activity 140, on turn, outputs a high-level label (positive or negative), with a confidence score, for each snippet representation. It thus starts the high-level stage of the proposed method (High-level Snippet Classification stage, in FIG. 3).

Given that each snippet may have various representations—and therefore, various high-level labels and confidence scores—the High-level Fusion activity 150 is responsible for taking the labels of the snippets and combining them along the video timeline, in order to obtain the moments when the content becomes sensitive. In the end, the Sensitive Moment Prediction 160 outputs the prediction of the sensitive video moments, what concludes the High-level Fusion stage, in FIG. 3. More details on the high-level fusion are given in FIG. 6.

It is noteworthy to mention that the present method does not work exclusively for a particular type of sensitive content (e.g., only for pornography, or only for violence). It works for any concept of interest.

Offline or Disconnected Execution (Training/Learning Phase)

FIG. 4 is a flowchart that depicts the offline operation of the proposed method, which corresponds to the training phase of the method. Each rectangular box is an activity, and the solid arrows represent the precedence of activities. Dashed arrows represent a simple flow of data, and cylinders represent any sort of storage device. The flowchart is generically represented to deal with visual, auditory and textual information, since the step sequences are similar, and particularities regarding each type of information will be properly described when necessary.

The depicted operation is offline, what means that it aims at training the method. This Training Phase (offline operation) must be done before the regular execution (online operation), in order to generate a mathematical model that is able to predict the class of unknown videos that will be analyzed during the regular execution (online operation). The offline operation thus starts by taking known and previously labeled training samples, which are stored as either Positive Video Snippets 20, or Negative Video Snippets 21.

Following, video information (frames, audio and/or text) is extracted in the Frame/Audio/Text Extraction activities 121, 123, 125. At this point, if the video information is visual, any type of frames may be used (e.g.: I, P or B frames, or even all the frames taken at a chosen or random frame rate). Moreover, the frame resolution may be simply maintained, or it may be reduced, whether for the sake of any further savings of computational time, or for any other reasons.

In the sequence, the Visual/Audio/Text Feature Extraction activities 122, 124, 126 are performed. In case of visual information (frames), it provides the low-level description of the extracted frames, by the means of any type of global or local still-image descriptor, interest point descriptor, or space-temporal video descriptor. Typical examples from the literature may include (but are not limited to) Scale Invariant Feature Transform (SIFT), Speeded Up Robust Features (SURF), Histogram of Oriented Gradients (HOG), Space Temporal Interest Points (STIP), etc. In case of auditory information (audio), it provides the low-level description of the audio snippets, and solutions to perform it may include (but are not limited to) Mel-frequency Cepstral Coefficients (MFCC), brightness, tonality, loudness, pitch, etc.

As a result of the feature extraction, the extracted information (visual, auditory and/or textual) is translated into feature vectors, which are susceptible to the application of diverse algebraic transformations that may enhance the quality of data (e.g., decorrelate the feature vector components, etc.). This is the aim of the Dominant Component Analysis activity 131, which analyses the numeric behavior of the feature vector components, and estimates algebraic transformations that may improve further separations of data samples. An example of doing so is by the application of Principal Component Analysis (PCA), but it is not limited to that. Because of such step, parameters of the chosen algebraic transformation are learned (a.k.a., estimated) from the training dataset, and they need to be stored for further use (what leads to the Projection Transformation data 22).

Once the parameters of the algebraic transformation are learned, the feature vectors are projected onto another vector space, task that is related to the Data Projection activity 132. Besides that, for the sake of saving computational time, it is common (but it is not an indispensable requirement) to project the feature vectors to another space that presents less components than the original one (i.e., the feature vectors are converted to smaller vectors, a.k.a. dimensionality reduction).

Prior to the mid-level aggregation representation of the low-level features, there is the necessity to construct the Codebook 23, for posterior reference. Such task is linked to the Codebook Construction activity 133, and usually there may be a codebook for each type of video information (visual, auditory and textual). There, the basic idea is to somehow split the space of low-level descriptions into multiple regions, where each region is associated to a visual/auditory/textual word. Thus, by the storage of these visual/auditory/textual words, we have a representative codebook 23. Strategies to construct the codebook may vary a lot. For instance, they may comprise (but are not limited to) unsupervised learning techniques, such as k-means clustering, or other clustering method (e.g., k-medians), etc. In a different fashion, other solution developers manage to use even simpler strategies, such as randomly sampling the description space, in order to raffle k representatives. Additionally, more sophisticated strategies can also be used, such as the application of an Expectation-Maximization (EM) algorithm to establish a Gaussian Mixture Model (GMM) on the low-level description space. In addition, content-aware approaches may be employed, where the codebook construction is done by the selection of a controlled number of representative feature vectors from each known problem class.

Once the codebook 23 is obtained, the next step comprises the Mid-level Encoding activity 134. This step aims at quantifying every low-level feature vector extracted from the frames/audio/text (previously on activities 122, 124, 126), with respect to their similarity to the words that compose the codebook 23. Techniques to do that may include (but are not limited to) hard- or soft-coding, and Fisher Vectors.

The following step, Snippet Pooling 135, aggregates the quantization obtained in the previous encoding step, by summarizing—in a single feature vector for each video snippet—how often the visual/auditory/textual words are being manifested. Strategies to do that may include (but are not limited to) sum, average or max pooling.

The steps 131-135 are considered sub-tasks of Video Snippet Mid-level Aggregate Representation 130.

Finally, from the mid-level aggregate representation of each training video snippet—whose labels are known in advance—a supervised machine learning technique can be employed to deduce a "good" video snippet classification model (i.e., a mathematical model that is able to predict, with high accuracy and enriched by a confidence score, the label of unknown video snippets). That is related to the Prediction Model Generation activity 141, and the learned/estimated Prediction Model 24 must be stored for further use (regular, online operation/execution). Usually, there may be a Prediction Model 24 for each type of video information (visual, auditory and textual). Many machine learning solutions may be applied to this last classification process. Alternatives may comprise (but are not limited to) Support Vector Machines (SVM), including the many SVM variations regarding the type of kernel function that is used to learn the data separation hyperplane, Random Forests, decision trees, etc.

Online or Connected Execution (Regular Use, or Execution Phase)

FIG. 5 is a flowchart that describes the online operation of the proposed method, which corresponds to the execution phase (regular use) of the method. Each rectangular box is an activity, and the solid arrows represent the precedence of activities. Dashed arrows represent a simple flow of data, and cylinders represent any sort of storage device. The flowchart is generically represented to deal with visual, auditory and textual information, since the steps sequence are similar, and particularities regarding each type of information will be properly described when necessary.

The described operation is online, what means that it represents a regular use of the method, when an Unknown Digital Video 25 is presented for analysis. As mentioned, at this point, the training phase or offline operation (depicted in FIG. 4) was already done.

In the Low-level Feature Extraction stage, the video is first segmented into video snippets, along the video timeline (Video Snippet Segmentation activity 110). As mentioned in the Method Overview (FIG. 3), these snippets may have fixed or varied temporal length, and they may or may not present temporal overlap.

In the sequence, Frame/Audio/Text Extraction (activities 121, 123, 125) and Visual/Audio/Text Feature Extraction (activities 122, 124, 126) must be performed in the same way as in the offline operation (please refer to FIG. 4).

Thereafter, Data Projection 132, Mid-level Encoding 134, and Snippet Pooling 135—that are also the same performed in the offline operation (see FIG. 4)—are executed one after the other. These steps 132, 134 and 135 are sub-tasks of Video Snippet Mid-level Aggregate Representation 130 (FIG. 3), and constitutes the Mid-level Video Snippet Representation stage. Please notice that, at this stage, the previously learned (during the offline operation, training phase, FIG. 4) Projection Transformation 22 and Codebook 23 are read/retrieved by activities Data Projection 132 and Mid-level Encoding 134, respectively.

In the end, in the High-level Video Snippet Classification stage, the labels of each unknown video snippet are predicted, with a confidence score, based on the Prediction Model 24 that was previously learned/estimated in the offline operation (FIG. 4). The prediction task is thus related to the Video Snippet Class Prediction activity 142, and it depends on the machine learning technique used to generate the Prediction Model 24. Alternatives may comprise (but are not limited to) Support Vector Machines (SVM), Random Forests, decision trees, etc.

Despite it is not illustrated in FIG. 5, the online operation of the proposed method continues to the next, final steps (as depicted in FIG. 3). Given that each snippet may have various representations—and therefore, various high-level labels and confidence scores provided by the previous step (Video Snippet Class Prediction 142)—, the High-level Fusion activity 150 is responsible for soundly combining them in a single answer. Then, in the end, the Sensitive Moment Prediction 160 outputs the prediction of the moments when the content becomes sensitive (i.e., pornography, violence, adult content or any other concept of interest that was previously trained and modeled by the offline operation of the proposed method). More details on the high-level fusion are given in FIG. 6.

In the online operation, when the proposed method detects sensitive content within an Unknown Digital Video, many actions can be taken in order to avoid the presentation of undesirable content, for instance (but not limited to) substitute the set of video frames with sensitive content by completely black frames, blurring the sensitive video frames, or displaying an alert/warning.

High-level Fusion Solution

FIG. 6 is a flowchart that describes the high-level fusion solution 150 of the method of the present invention. Each rectangular box is an activity, and the solid arrows represent the precedence of activities. Dashed arrows represent a simple flow of data, and cylinders represent any sort of storage device. The diamond, in turn, represents a conditional branch, which provides two different paths on the flow: one for the offline method operation, and another for the online operation. A parallelogram represents input/output.

As it is shown by the means of items 26 to 29, the fusion starts from the class predictions of diverse video snippets, which are grouped accordingly to the low-level feature extraction method that was employed to describe them. Therefore, item 26, for instance, may refer to the output predictions of a visual-based video snippet classifier that relied on SIFT (Low-level Feature 1) to describe the video content at the low-level stages of the proposed method. Similarly, item 27 may refer to the outputs of an auditory-based classifier that relied on MFCC (Low-level Feature 2), while item 28 may refer to a visual-, SURF-based video snippet classifier (Low-level Feature 3). Finally, item 29 may refer to a textual-based classifier (Low-level Feature N). The number N of fused classifiers may be even or odd, ranging from a single one, to a ton of classifiers. Moreover, the nature of the employed low-level features may be any of the possible ones (either visual, or auditory, or textual), no matter their order, majority or even absence (no use of textual features, for instance).

In the sequence, the outputs of the N video snippet classifiers 26 to 29 may be aligned along the video timeline, as a manner to organize how the different classifiers evaluated the sensitiveness of the video content. This is the task related to the optional Snippet Temporal Alignment activity 151, which presumes that the video snippets have a reference time (i.e., an instant within the original video timeline that the snippet is more representative of). A snippet reference time may be the first instant of the snippet, but alternatives may consider the most central or even the last instant.

Next, an N-dimensional vector is constructed for every instant of interest of the target video (e.g., for every second of video). Within this vector, every i-th component (with i belonging to the natural interval [1 . . . N]) must hold the classification confidence score of the i-th snippet classifier, regarding the video snippet whose reference time coincides with the instant of interest. In the case of missing snippets, the confidence score may be assumed as a value of complete uncertainty (e.g., 0.5, in the case of a normalized confidence score, which varies from zero—i.e., no confidence at all—to one—i.e., total confidence), or it may be interpolated. Such task of N-dimensional vector representation is related to the N-dimensional Vector Representation activity 152.

In the offline operation (training/learning phase) of the method, various training video samples and their respective classified snippets have their classification scores combined into these N-dimensional score vectors. Considering that each N-dimensional vector represents an instant of interest within the target video, the labels of such vectors are deductible from the training dataset groundtruth 30, 31, as long as the training dataset is annotated at frame level. Therefore, the Late Fusion Model Generation activity 153 receives the training dataset groundtruth (represented by the Positive Groundtruth and Negative Groundtruth storages, respectively 30 and 31), and employs a supervised machine learning technique to generate a good late fusion model: i.e., a mathematical model that is able to predict, with high accuracy and enriched by a confidence score, the label of an unknown N-dimensional vector. The learned Late Fusion Model 32 must be stored for further use (during regular, online use/execution). At this point, many machine learning solutions may be applied, for instance (but not limited to) SVM, Random Forests, and decision trees.

Concerning the online operation, an unknown video sample and its respective video snippets have their classification scores properly combined into the N-dimensional score vectors (on activity 152). At this point, it is important to mention that the order in which the outputs of the video snippet classifiers are combined must be the same that was adopted in the offline fusion operation.

Thereafter, the N-dimensional Vector Class Prediction activity 154 retrieves the Late Fusion Model 32, and predicts the labels of each N-dimensional vector, with a proper confidence score. Given that each N-dimensional vector represents an instant of interest within the unknown video, the predicted labels actually predict every instant of interest of the video.

Notwithstanding, giving a classification confidence score for every video instant of interest may generate a very noise answer in time, with interleaving positive and negative segments at an unsound rate that may change too much and too much fast, regarding the actual occurrence of enduring and relevant sensitive events. Hence, in the Classification Score Noise Suppression activity 155, any kind of denoising function can be used to flatten the classification score, along the video timeline. Strategies to do that may include (but are not limited to) the use of Gaussian blurring functions.

Next, the Classification Score Fusion activity 156 aims at combining the scores of adjacent video instants of interest that belong to the same sensitive class, according to decision thresholds. The inherent idea, therefore, is to substitute the sequences of diverse scores by a single and representative one, which may persist for a longer time, thus better characterizing the sensitive or non-sensitive video moments. Strategies to do that may comprise (but are not limited to) assuming a score threshold t, and then substituting all the time adjacent scores equal to or greater than t by their maximum (or average) value, and all the time adjacent scores smaller than t by their minimum (or average) value.

Finally, the Sensitive Moment Prediction 160 outputs the prediction of the moments when the content becomes sensitive (i.e., pornography, violence, adult content or any other concept of interest that was previously trained and modeled by the offline operation of the proposed method).

Experiments and Results

In the context of the experiments using the proposed method of the present invention, we report the results for pornography classification on Pornography-2K dataset. It comprises nearly 140 hours of 1000 pornographic and 1000 non-pornographic videos, which varies from six seconds to 33 minutes.

To evaluate the results of our experiments, we apply a 5×2-fold cross-validation protocol. It consists of randomly splitting the Pornography-2K dataset five times into two folds, balanced by class. In each time, training and testing sets are switched and consequently 10 analyses for every model employed are conducted.

The method of the present invention has a classification accuracy of 96% for pornography, and the analysis takes about one second per analyzed frame in a mobile platform (which has computational/hardware restrictions). The method does not require the analysis of all frames in the video in order to reach its high accuracy. Just one frame must be analyzed per second. For instance, if the video has 30 or 60 frames per second, the required rate of frames to be analyzed is 1 every 30 or 60 frames. Therefore, in real-time execution, the analysis time is always lesser than video timeline.

Regarding violence classification, as mentioned, there is a lack of a common definition of violence, absence of standard datasets, and the existing methods were developed for a very specific type of violence (e.g., gunshot injury, war violence, car chases). Consequently, the results were not directly comparable. For this reason, the proposed method was tested on a benchmarking initiative dedicated to evaluate new methods to automated detection of violent scenes in Hollywood movies and web videos, called MediaEval Violent Scenes Detection (VSD) task, which provides a common ground truth and standard evaluation protocols. The proposed method obtained a classification accuracy of 87% for violence.

These results represent an efficient and effective classification of diverse sensitive media on mobile platforms.

Applications

There are many applications for the method of the present invention:

detecting, via surveillance cameras, inappropriate or violent behavior;

blocking undesired content from being uploaded to (or downloaded from) general purpose websites (e.g., social networks, online learning platforms, content providers, forums), or from being viewed on some places (e.g., schools, workplaces);

preventing children from accessing adult content on personal computers, smartphones, tablets, smart glasses, Virtual Reality devices, or smart TVs; and avoiding that improper content is distributed over phones by sexting, for instance.

Although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

The invention claimed is:

1. A method comprising:
performing, by at least one processor, operations including:
segmenting a digital video stream into video fragments along a video timeline;
extracting low-level features containing significant information on sensitive media from the video fragments;
reducing a semantic difference between the extracted low-level features, and a high-level concept;
classifying the video fragments, and generating a high-level label as either positive or negative and a confidence score for each classified video fragment;
performing high-level fusion to correlate the generated high-level labels and the confidence scores for each classified video fragment; and
identifying a particular content of the digital video stream by combining the generated high-level labels of the classified video fragments along the video timeline,
wherein the performing the high-level fusion comprises:
temporally aligning N classified video fragments along the video timeline;
representing an N-dimensional vector, which builds an N-dimensional vector for each instant of interest of the digital video stream, and within the N-dimensional vector, every i-th component holds a classification confidence score of the i-th classified video fragment, in relation to a video fragment having a reference moment which coincides with a reference instant of interest, wherein i belongs to the natural interval [1 . . . N]);
in an offline operation, generating a late fusion model from a training dataset, employing a supervised machine learning method on the generated late fusion model to generate a good late fusion model, and storing the good late fusion model; and
in an online operation, retrieving the stored good late fusion model and using the retrieved good late fusion model, a de-noising function, and a predetermined threshold to correlate the generated high-level labels and the confidence scores for each classified video fragment.

2. The method of claim 1, wherein the low-level features include visual, auditory, and text features.

3. The method of claim 1, wherein the reducing the semantic difference comprises:
analyzing dominant components by transforming the extracted low-level features into a feature vector;
projecting the feature vector into another vector space;
building a codebook by splitting a space of low-level descriptions in various regions into words, and storing these words in the codebook;
mid-level coding to quantify the feature vector by a similarity to the stored words in the codebook; and
grouping the video fragments by aggregating the quantified feature vector.

4. The method of claim 1, wherein the reducing the semantic difference comprises data projection, mid-level coding, and grouping of the video fragments using a codebook.

5. The method of claim 1, wherein the classifying the video fragments comprises offline generating a prediction model which applies a supervised machine learning technique to deduce an ideal video fragments classification model.

6. The method of claim 1, wherein the classifying the video fragments comprises predicting a video segment class, wherein labels for each video segment are predicted with a confidence score based on a prediction model.

7. The method of claim 1, wherein the operations are performed in real time on at least one of smartphones, tablets, smart glasses, virtual reality devices, displays, and smart TVs.

8. The method of claim 1, wherein the video fragments have at least one of a varied temporal size and a temporal overlap.

9. The method of claim 3, wherein parameters in the analyzing the dominant components are learned from a training dataset, and stored in a projection transformation dataset.

10. The method of claim 1, wherein the supervised machine learning method comprises at least one of: support vector machine, Random Forests, and decision trees.

11. The method of claim 1, wherein the confidence score is interpolated.

12. A non-transitory computer-readable recording medium storing a program to implement a method comprising:
performing, by at least one processor, operations including:
segmenting a digital video stream into video fragments along a video timeline;
extracting low-level features containing significant information on sensitive media from the video fragments;

reducing a semantic difference between the extracted low-level features and a high-level concept;

classifying the video fragments, and generating a high-level label as either positive or negative and a confidence score for each classified video fragment;

performing high-level fusion to correlate the generated high-level labels and the confidence scores for each classified video fragment; and identifying a particular content of the digital video stream by combining the generated high-level labels of the classified video fragments along the video timeline, wherein the performing the high-level fusion comprises:

temporally aligning N classified video fragments along the video timeline;

representing an N-dimensional vector, which builds an N-dimensional vector for each instant of interest of the digital video stream, and within the N-dimensional vector, every i-th component holds a classification confidence score of the i-th classified video fragment, in relation to a video fragment having a reference moment which coincides with a reference instant of interest, wherein i belongs to the natural interval [1 . . . N]);

in an offline operation, generating a late fusion model from a training dataset, employing a supervised machine learning method on the generated late fusion model to generate a good late fusion model, and storing the good late fusion model; and in an online operation, retrieving the stored good late fusion model and using the retrieved good late fusion model, a de-noising function, and a predetermined threshold to correlate the generated high-level labels and the confidence scores for each classified video fragment.

13. An apparatus comprising:

at least one memory configured to store instructions; and at least one processor configured to execute the stored instructions to implement a method comprising:

segmenting a digital video stream into video fragments along a video timeline;

extracting low-level features containing significant information on sensitive media from the video fragments;

reducing a semantic difference between the extracted low-level features and a high-level concept;

classifying the video fragments, and generating a high-level label as either positive or negative and a confidence score for each classified video fragment;

performing high-level fusion to correlate the generated high-level labels and the confidence scores for each classified video fragment; and identifying a particular content of the digital video stream by combining the generated high-level labels of the classified video fragments along the video timeline, wherein the performing the high-level fusion comprises:

temporally aligning N classified video fragments along the video timeline;

representing an N-dimensional vector, which builds an N-dimensional vector for each instant of interest of the digital video stream, and within the N-dimensional vector, every i-th component holds a classification confidence score of the i-th classified video fragment, in relation to a video fragment having a reference moment which coincides with a reference instant of interest, wherein i belongs to the natural interval [1 . . . N]);

in an offline operation, generating a late fusion model from a training dataset, employing a supervised machine learning method on the generated late fusion model to generate a good late fusion model, and storing the good late fusion model; and in an online operation, retrieving the stored good late fusion model and using the retrieved good late fusion model, a de-noising function, and a predetermined threshold to correlate the generated high-level labels and the confidence scores for each classified video fragment.

\* \* \* \* \*

UNITED STATES PATENT AND TRADEMARK OFFICE
CERTIFICATE OF CORRECTION

PATENT NO. : 10,194,203 B2
APPLICATION NO. : 15/198626
DATED : January 29, 2019
INVENTOR(S) : Sandra Avila et al.

It is certified that error appears in the above-identified patent and that said Letters Patent is hereby corrected as shown below:

On the Title Page

Item [71] (Applicants), Line 1:
Delete "ELECTRÔNICA" and insert -- ELETRÔNICA --, therefor.

Item [73] (Assignees), Line 2:
Delete "AMACÔNIA" and insert -- AMAZÔNIA --, therefor.

Signed and Sealed this
Twenty-third Day of April, 2019

Andrei Iancu
*Director of the United States Patent and Trademark Office*